Patented May 4, 1954

2,677,702

UNITED STATES PATENT OFFICE 2,677,702

HYDROCARBON COPOLYMER SULFONIC ACID DERIVATIVES

Herman S. Bloch, Chicago, Alfred E. Hoffman, Clarendon Hills, and Howard E. Mammen, North Riverside, Ill., assignors to Universal Oil Products Company, Chicago, Ill., a corporation of Delaware No Drawing. Application October 5, 1950, Serial No. 188,656

9 Claims. (Cl. 260—513)

This invention relates to sulfonic acids and their salts, derivatives of a certain class of hydrocarbon polymers prepared by means of a specific procedure as hereinafter described. More specifically, the present invention concerns a class of sulfonic acid and sulfonate salt derivatives of certain hydrocarbon copolymers, said derivatives being particularly useful as anionic surface active agents and detergents in aqueous solution and as emulsifying agents generally.

The products formed in the process of the present invention possess surface activity in aqueous solution and are particularly active as emulsifying agents to promote emulsion formation in a system of liquids comprising aqueous and oleaginous phases. They are essentially alkyl sulfonic acids or, alternatively, salts thereof formed by a process which comprises copolymerizing a mixture of mono- and polyolefinic hydrocarbons at a reaction temperature and at polymerizing conditions which result in the formation of a normally liquid copolymer in the presence of a polymerization catalyst comprising sulfur trioxide.

In a more specific embodiment thereof, this invention concerns a process for the production of a surface active agent which comprises copolymerizing an aliphatic mono-olefinic hydrocarbon with a polyolefinic hydrocarbon and effecting substantially simultaneous sulfonation thereof in the presence of a reagent comprising sulfur trioxide and a hydrocarbon solvent having a boiling point of from about —100° to about 0° C.

Another embodiment of the invention relates to an emulsifying agent produced by the process which comprises copolymerizing and substantially simultaneously sulfonating an equimolar mixture of butadiene-1,3 and isobutylene at a temperature of from about —100 to about 0° C. in the presence of sulfur trioxides and hydrofluoric acid containing at least 90% hydrogen fluoride at reaction conditions which in the absence of a sulfonating agent, result in the formation of a normally liquid copolymer of said hydrocarbons.

Further aspects of the invention relating to other objects and embodiments thereof will be referred to with greater detail in the following specifications.

The present products, which are essentially alkyl sulfonic acids and their sulfonate salts, are a mixture of various long chain alkyl sulfonic acids in which the hydrocarbon portion of the molecule corresponds to the hydrocarbons obtained by copolymerizing an aliphatic mono-olefin with a diolefin at temperatures of from about —100° to about 0° C. and at other reaction conditions which normally, in the absence of the sulfonating agent, result in the formation of a liquid copolymer product. In the present process, the sulfonic acid radical is introduced into the structure of the product substantially simultaneously with the copolymerization of the olefinic hydrocarbon reactants. In accordance with the process herein provided, an aliphatic mono-olefin or a mixture thereof in which the individual hydrocarbon contain fewer than about 6 carbon atoms per molecule, such as propylene, n-butylene, isobutylene, n-amylene, hexylene, isoamylene, etc. is mixed with a conjugated diene in a molar proportion of diene to mono-olefinic hydrocarbon of from about 10 to 1 to about 1 to 1 at a temperature of from about —100° to about 0° C. and in the presence of a catalyst-sulfonating agent comprising sulfur trioxide. The indicated range of limits on the proportion of diene to mono-olefin reactants is specified by the lower and upper limits respectively of this factor within which range the polymeric product is normally formed in the desired liquid form when the mono- and diolefinic reactants are copolymerized in admixture under the indicated conditions in the absence of the sulfonating reagent comprising sulfur trioxide. The proportion of mono-olefinic to dienic hydrocarbon reactants is designated in the above range for the further reason that by controlling the proportion of mono-olefinic reactant in the polymerization reaction, the molecular weight of the final product may be controlled to form molecules in which the hydrocarbon portion is of sufficient size to provide a hydrophobic group requisite for surface activity but in which the number of sulfonic acid groups introduced therein during the polymerization-sulfonation reaction is limited to not less than about one, and not more than about 3 per molecule, thus preserving the critical balance of hydrophobic and hydrophilic groups present in the ultimate product which constitutes one of the principal structural requirements for the product to have surface active emulsifying properties in aqueous solution. The reaction conditions are selected within the specified range in order to further restrict the molecular weight of the copolymer formed during the process to one which is normally liquid, since at temperatures above about 0° C., the copolymerization proceeds too rapidly, causing the formation of hydrocarbon copolymers of molecular weight greater than optimum for effective surface active agents when sulfonated. At temperatures below about —100° C., the polymerization reaction proceeds too slowly for practical purposes.

The conjugated diene reactant of the present process is a compound selected from the group consisting of the diolefinic hydrocarbons and the halogen substituted analogs thereof, preferably containing from about 4 to about 8 carbon atoms per molcule. Specific compounds selected from the above classes and utilizable as the conjugated diene reactant in the present process comprise, for example, butadiene-1,3, piperylene, cyclopentadiene, hexadiene-1,3 hexadiene-2,4, cyclohexadiene-1,3 and homologs and isomers thereof. The halogen substituted derivatives of the above conjugated dienes, such as chloroprene (2 - chlor - butadiene-1,3), 1,4-dichlorobutadiene-1,3, etc. may likewise be utilized as the conjugated diene reactant in the present process.

The polymerization catalyst-sulfonating agent employed in the process of this invention may consist wholly of sulfur trioxide individually or the latter may be combined with a solvent or admixed with another reagent which may act in the capacity of a polymerization catalyst. Thus, for example, the mixture of mono-olefinic hydrocarbon and conjugated diene may be contacted with sulfur trioxide either in a liquid or vapor state, and when vaporized it may be, and is desirably, diluted prior to contacting the mixture of reactants with an inert diluent, such as air, nitrogen, carbon dioxide, carbon monoxide, etc., the latter diluted reagent being particularly suitable for controlling the reaction temperature and rate of reaction in the resulting simultaneous polymerization and sulfonation reactions. In order to further limit the rate of contact between the sulfur trioxide and the mixture of mono-olefinic and conjugated diene reactants, the sulfur trioxide is vaporized or dilute vapor form may be led onto the surface of a mixture of the diolefin and conjugated diene reactants as the latter is vigorously stirred. A preferred method of conducting the present simultaneous copolymerization and sulfonation process comprises contacting a mixture of the reactants with the sulfur trioxide reagent admixed with an appropriate polymerization catalyst, such as hydrofluoric acid containing at least 90% hydrogen fluoride, and preferably 95 to 100% hydrogen fluoride, boron trichloride and trifluoride, mixtures of $BF_3$ and $HF$, sulfonyl chloride, fluorosulfonic acid, aluminum bromide and aluminum chloride, and other polymerization catalysts known in the art and characterized generally as acid-acting substances which are stable in the presence of sulfur trioxide. One of the preferred catalyst mixtures for this purpose is a mixture of anhydrous hydrogen fluoride and sulfur trioxide, also known as fluorosulfonic acid, and other mixtures containing from 1:1 to about 10:1 weight proportions of hydrogen fluoride per unit weight of sulfur trioxide. Utilizing such a mixture or one in which the sulfur trioxide is the sole catalyzing component, the proportion of total sulfur trioxide to combined weight of diolefin and conjugated diene reactants charged to the reaction is from about 5 to about 20% by weight of the latter, and when utilizing a mixture of sulfur trioxide and a polymerization catalyst other than sulfur trioxide, sufficient sulfur trioxide is charged to the reaction mixture to effect monosulfonation of the resultant polymer on the basis of the molecular weight of the coplymer ranging from about 1000 to about 6000, depending upon the temperature and other reaction conditions.

The present copolymerization-sulfonation reaction is preferably conducted in the presnce of an inert solvent for the reactants which acts in the capacity of a diluent of the reaction mixture, thereby controlling the rate of reaction, the temperature of the reaction mixture at the particular rate of polymerization and sulfonation, and the degree of polysulfonation obtained during the course of the reaction. A convenient, positive method of controlling the reaction temperature, eliminating local high temperature zones in the reaction mixture is to conduct the reaction in the presence of a low-boiling solvent which is maintained in the liquid state during the reaction, by external cooling or by allowing the solvent to reflux at its boiling point, thereby dissipating the heat of reaction by vaporization of the low-boiling diluent. Among the preferred diluents for this purpose are liquid sulfur dioxide, and the liquefied low melecular weight hydrocarbons, such as ethane (B. P. 760 mm. Hg : —88.3° C.) propane (B. P. 760 mm. Hg : —42.1° C.), n-butane (B. P. 760 mm. Hg : —0.6° C.), solid carbon dioxide ("Dry Ice"), difluorodichloromethane, and others. The inert solvent-diluent is preferably admixed with the mono-olefin and conjugated diene reactants prior to contacting the sulfur trioxide and the polymerization catalysts therewith. Where the diluent also acts as an internal refrigerant for the system, the evaporation of which removes the internal heat of reaction, the quantity employed is at least sufficient to remove all of the sensible heat of reaction and the amount is preferably at least equal in volume to the volume of reactants, up to about 10 volumetric proportions thereof. When independent and extraneous sources of refrigeration are employed in the reaction, such as refrigeration by external or internal cooling coils having circulated therethrough a refrigerant, the boiling point of the inert liquid diluent is unimportant, except in so far as the molecular weight of the compound utilized as diluent affects its viscosity and heat conductivity at the sub-zero temperatures at which the present process is operated.

The reaction period for the present process is, in general, determined by the length of time required to effect substantially monosulfonation of the polymer formed in the accompanying polymerization reaction. It is undesirable in the formation of surface active agents having optimum effectiveness as such, to continue the period of contact between the sulfur trioxide reagent and the reactant monomers involved in the present process for much longer than that sufficient to effect monosulfonation, since the number of sulfonic acid groups introduced into the molecule has an important bearing on the hyrophilic-hydrophobic balance required for the production of effective surface active agents. The optimum critical balance of these factors in the formation of surface active agents of the type herein provided, containing alkyl groups of molecular weight of from about 2000 to about 6000, is obtained when the resultant sulfonic acid molecule contains at least 1, but preferably not more than about 2.5 sulfonic acid radicals per molecule of polymer. For this purpose, the reaction period is preferably not less than about 10 minutes and not greater than about 2 hours of contact between the sulfur trioxide-containing reagent and the mixture of aliphatic mono-olefin and conjugated diene reactants.

Following the indicated period of contact between the reagent and hydrocarbons, the reaction is stopped and the desired sulfonic acid product is separated from the copolymerization-sulfonation reaction mixture by the addition of a solvent thereto and separation of the resulting phases. Suitable solvents which may be added for this purpose include such compounds as water, alcohols, preferably, a low molecular weight alcohol such as methanol, ethanol, propanol, isopropanol, etc., ethers, such as diethyl ether, esters of organic acids, such as ethyl acetate, etc., and, in general, other oxygen-containing organic compounds which form molecular addition complexes with the polymerization catalyst and sulfur trioxide or which dilute the latter reagents until ineffective for further polymerization and/or sulfonation.

Simultaneously with or subsequent to the addition of an oxygen-containing organic solvent or water to the copolymerization-sulfonation reaction mixture, an aromatic or paraffinic hydrocarbon may be added thereto and mixed with the reaction mixture to separate a resulting phase rich in the sulfonic acid derivative and containing the aromatic or paraffinic hydrocarbon solvent. The latter phase, which may be separated from the other components of the reaction mixture by decantation, may thereafter be treated to recover the sulfonic acid product therefrom, as for example, by evaporation of the aromatic hydrocarbon solvent, or by neutralizing the separated phase with a suitable base to form the preferred sulfonate salt modification of the present product. Suitable bases which may be employed for neutralizing the sulfonic acid formed in the copolymerization-sulfonation process to form the present preferred sulfonate salts, include both inorganic and organic bases, such as the alkali metal hydroxides, typical of which are sodium and potassium hydroxide, the mono-, di-, and trialkyl amines, such as, for example, monoethyl amine, dimethyl and diethyl amines, trimethyl and triethyl amines, the corresponding mono-, di-, and tripropyl amines, the mono-, di-, and trialkanol amines, such as tri- or diethanol amine, and others capable of neutralizing the alkyl sulfonic acids formed in the present process. One of the preferred bases for the preparation of a highly effective surface active agent which is also one of the least expensive of the various bases, is an aqueous solution of sodium hydroxide in concentrated form. The resulting sulfonate salt is desirably composited with other essentially inorganic materials which tend to enhance the surface activity of the alkyl sulfonic acids and sulfonates formed herein. Typical of such materials are the alkali metal and ammonium sulfates, halides, silicates, borates, phosphates, polyphosphate and other salts generally recognized in the art as enhancing the detergency of the present sulfonate products when dissolved in water. Other compounds, such as sodium carboxymethylcellulose, cellulose methyl ethers, etc. may be incorporated with the present detergent product to increase the soil-suspending properties of the aqueous detergent solution.

The present invention will be further illustrated with respect to specific embodiments thereof and particularly with respect to specific reactants utilizable in the present process which will be illustrated in the following examples.

*Example I*

144 cc. of liquid propane was introduced into a stainless steel vessel equipped with a motor-driven stirrer and cooled with a Dry Ice-acetone bath which maintained the liquid propane at approximately $-65°$ C. A mixture of 74.9 gms. of butadiene-1,3 and 13.1 gms. of isobutylene was added to the liquid propane, followed by the addition thereto of a mixture of sulfur trioxide and sulfur dioxide containing 10.8 gms. of sulfur trioxide and 46.85 gms. of sulfur dioxide. The latter mixture was added to the liquid hydrocarbon over a period of 1 hour, accompanied by vigorous stirring of the mixture with a motor-driven stirrer. Following the above reaction period, 50 cc. of a mixture of ethanol and water containing 75% ethanol was added to the reaction mixture, followed by 50 gms. of solid benzene. The mixture in the stainless steel vessel was then allowed to warm to room temperature, the vaporized gases being collected and measured. The condensible gases recovered consisted of butadiene, isobutylene, carbon dioxide, and a small amount of $C_5$ hydrocarbons. The liquid product remaining in the reactor was diluted with water and the hydrocarbon phase recovered therefrom by decantation. The mixture was heated to remove water and benzene in a light topping distillation and the remaining liquid sulfonic acids recovered as the product. The liquid sulfonic acid product was a slightly tan-colored material which foamed profusely when shaken with water and readily produced an emulsion when either a hydrocarbon oil or vegetable oil was added to an aqueous solution of the product and the mixture shaken to form the emulsion. An aqueous solution of the neutralized sulfonic acids formed in the above reaction (neutralized with caustic to a pH of 7) possesses detersive properties approximately equal to that of an equivalent aqueous concentration of sodium laurate.

*Example II*

The beneficial effect of including a polymerization catalyst with the sulfur trioxide added to the mixture of polymerizable monomers is illustrated in the following experiment. 60 gms. of liquefied propane is added to a stainless steel reactor equipped with a motor-driven stirrer and surrounded by a Dry Ice-acetone cooling bath which maintains the temperature of the reactor contents at approximately $-65°$ C. A mixture of 75 gms. of butadiene and 25 gms. of isobutylene in liquid form is then added to the liquid propane to form a solution of the polymerizable monomers in liquid propane. Vaporized anhydrous hydrogen fluoride is then bubbled through liquid sulfur trioxide at a temperature of approximately 30° C., entraining about 10% by volume of gaseous sulfur trioxide in the hydrogen fluoride vapors. The mixed vapors are then bubbled into the liquid hydrocarbon mixture maintained at $-65°$ C. while the reactor contents are vigorously stirred by means of the motor driven stirrer. The mixed vapors of hydrogen fluoride and sulfur trioxide are led into the mixture of hydrocarbons over a period of 1.5 hours, a total of 10 gms. of sulfur trioxide and 25 gms. of anhydrous hydrogen fluoride being added to the hydrocarbon mixture over the above reaction period. The fluid mixture is stirred for an additional 2 hours at a temperature of $-65°$ C., following which, 100 ml. of 75% ethanol and 50 gms. of solid benzene are stirred into the reactants. The resulting mixture is then heated to room temperature and the condensible, vaporized gases collected in a Dry-Ice trap. The mixture of condensible gases consists of propane, a small amount of isobutylene and a small quantity of C5 hydrocarbons. The liquid product remaining in the polymerization-sulfonation reactor after vaporization of the volatile condensible gases therefrom is diluted with water, neutralized with sodium hydroxide solution, and the hydrocarbon phase recovered from the resulting solution by decantation. The solid sulfonate salt product is slightly tan colored and is an effective emulsifying and surface active agent. The yield of product, based upon the butadiene and isobutylene charged to the reaction mixture, is approximately 87%.

*Example III*

A product having detersive properties in aqueous solution approximately equivalent to that of sodium oleate soap in corresponding aqueous concentrations, is formed by the copolymerization-sulfonation of a mixture of isobutylene and cyclopentadiene utilizing 10 molar proportions of cyclopentadiene to 3 of isobutylene, in accordance with a procedure similar to that described in Example II, above, in which the copolymerization-sulfonation is effected with the aid of a mixture of hydrogen fluoride and sulfur trioxide introduced into a mixture of the hydrocarbon monomers dissolved in liquid propane at −65° C. The sulfonate salt formed by neutralization of the product with sodium hydroxide is formed in a yield of approximately 78% of theoretical, based upon the quantity of hydrocarbon monomers charged to the reaction.

We claim as our invention:

1. A process for the production of an emulsifying and surface active agent which comprises copolymerizing an aliphatic mono-olefinic hydrocarbon containing not more than 8 carbon atoms with a diene selected from the group consisting of conjugated diolefinic hydrocarbons of from about 4 to about 8 carbon atoms and their halogen substituted analogs at a temperature of from about −100° C. to about 0° C. and in the presence of sulfur trioxide, whereby to effect sulfonation substantially simultaneously with the copolymerization.

2. A process for the production of an emulsifying and surface active agent which comprises subjecting a mixture of an aliphatic mono-olefinic hydrocarbon containing not more than 8 carbon atoms and a diene selected from the group consisting of conjugated diolefinic hydrocarbons of from about 4 to about 8 carbon atoms and their halogen substiutted analogs to the simultaneous action of a polymerization catalyst and sulfur trioxide at a temperature of from about −100° C. to about 0° C.

3. A process for the production of an emulsifying and surface active agent which comprises subjecting a mixture of an aliphatic mono-olefinic hydrocarbon containing not more than 8 carbon atoms and a diene selected from the group consisting of conjugated diolefinic hydrocarbons of from about 4 to about 8 carbon atoms and their halogen substituted analogs to the simultaneous action of hydrogen fluoride and sulfur trioxide at a temperature of from about −100° C. to about 0° C.

4. The process of claim 1 further characterized in that said aliphatic mono-olefin is an iso-olefinic hydrocarbon.

5. The process of claim 1 further characterized in that said aliphatic mono-olefinic hydrocarbon is isobutylene.

6. The process of claim 1 further characterized in that said reaction is effected in the presence of an inert diluene-solvent for the mixture of olefinic reactants.

7. The process of claim 1 further characterized in that said conjugated diene is butadiene-1,3.

8. A process for the production of a surface active and emulsifying agent which comprises reacting at a temperature from about −100° C. to about 0° C. a mixture of an aliphatic mono-olefinic hydrocarbon containing not more than 8 carbon atoms and a conjugated diolefinic hydrocarbon of from about 4 to about 8 carbon atoms with a polymerization catalyst-sulfonating agent comprising sulfur trioxide, adding to the resulting reaction mixture an agent which substantially reduces the activity of said polymerization catalyst-sulfonating agent and a hydrocarbon solvent of the copolymer sulfonic acid formed in the reaction selected from the group consisting of an aromatic and a paraffinic hydrocarbon.

9. The process which comprises reacting at a temperature from about −100° C. to about 0° C. a mixture of butadiene-1,3 and isobutylene containing from about 10 to 1 to about 1 to 1 molar proportions of butadiene to isobutylene dissolved in from about ½ to about 10 volume proportions of liquid propane with a mixture of anhydrous hydrogen fluoride and sulfur trioxide, thereafter adding to the resulting reaction mixture ethyl alcohol and benzene, separating the resulting phases and adding to the benzene phase an aqueous solution of sodium hydroxide.

References Cited in the file of this patent

UNITED STATES PATENTS

| Number | Name | Date |
| --- | --- | --- |
| 2,061,617 | Downing et al. | Nov. 24, 1936 |
| 2,135,358 | Suter | Nov. 1, 1938 |
| 2,349,232 | Joshel | May 16, 1944 |
| 2,389,693 | Sparks et al. | Nov. 27, 1945 |
| 2,429,582 | Morris et al. | Oct. 21, 1947 |
| 2,430,137 | Oblad et al. | Nov. 4, 1947 |
| 2,473,472 | Gorin et al. | June 14, 1949 |
| 2,524,086 | Schmerling | Oct. 3, 1950 |